Oct. 23, 1934.　　　　H. W. McINTOSH　　　　1,977,969
GLASS LEVEL CONTROL MECHANISM AND METHOD
Filed March 22, 1933
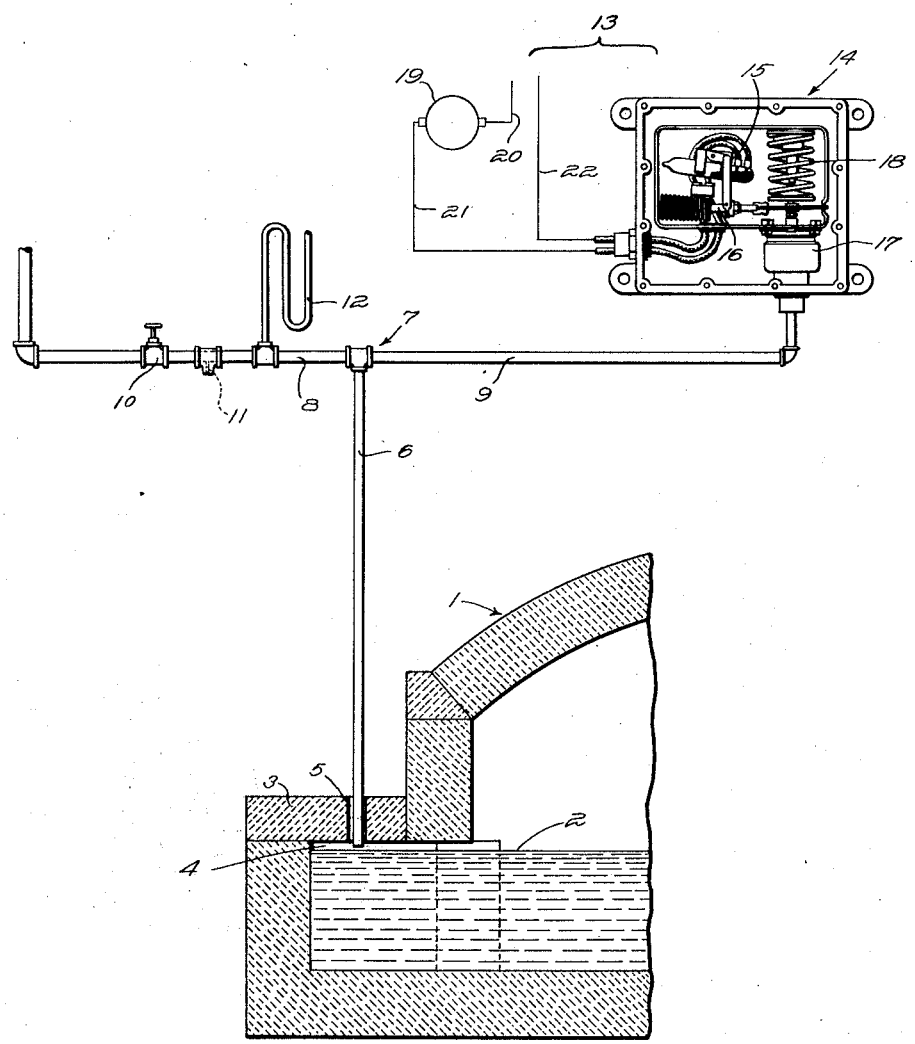
Inventor;
Harold W. McIntosh
by Brown & McLain
Attorneys
Witness;
W. B. Thacker Patented Oct. 23, 1934

1,977,969

UNITED STATES PATENT OFFICE 1,977,969

GLASS LEVEL CONTROL MECHANISM AND METHOD

Harold W. McIntosh, Windsor, Conn., assignor to Hartford-Empire Company, Hartford, Conn., a corporation of Delaware Application March 22, 1933, Serial No. 662,056

9 Claims. (Cl. 49—54)

This invention relates to improvements in mechanisms for and methods of controlling the level of a body of molten glass in a tank, forehearth or other container from which glass is being fed or otherwise removed.

For reasons which are well appreciated in the art and which, therefore, need not be stated herein, it is usually desirable to maintain a substantially constant supply body of molten glass in a container from which glass is being fed or otherwise removed. To this end, it usually is attempted to add molten glass to the supply body in such manner and at such rate as to keep the level of the glass of the supply body substantially constant.

Where the supply body of glass is obtained by the operation of a melting tank or furnace, as is usual, the maintenance of the supply body of glass at the desired level is attempted by feeding glass-making materials or batch into the tank or furnace at a rate and in such manner as are intended to compensate for the glass removed.

When the glass-making materials or batch are fed to the glass-melting tank or furnace by a workman, or by manually controlled mechanism, the addition of new glass to the supply is determined by the skill and efficiency of the workman. These may not be adequate to maintain desirable uniformity of level of the glass supply body.

It has been proposed to control the feeding of the glass-making materials or batch to the tank or furnace by automatic mechanism responsive to a change of level of the glass. Such automatic control mechanisms ordinarily include a float or other instrumentality, such as an electrical contact member, the operation of which requires contact of the molten glass therewith. This requirement places limitations on the character and efficiency of such control mechanisms. The life of such a mechanism may be relatively short and the operation thereof may be impaired by reason of the detrimental effect of the glass on the part with which the glass contacts.

According to the present invention, the level of the glass of the supply body is controlled by mechanism which is entirely out of contact with the glass and which, therefore, is not subject to difficulties that attend the operation of control mechanisms having parts in contact with the glass. Control mechanism for carrying out the present invention may be relatively simple in construction and is adapted to function accurately and efficiently over a long period of service.

An object of the present invention is to provide a glass level control mechanism having means for producing a substantially constant pressure condition at a control point above the supply body of glass in the container when the glass of the supply body is at a predetermined desirable level and for producing a change in such pressure condition in accordance with a change of level of the glass in the supply body, together with means responsive to a change in such pressure condition at the control point for controlling the addition of glass to the supply body so as promptly to restore the desired glass level.

A further object of the invention is to control the level of glass in the container by measuring the pressure at a control point above the glass in the container, and automatically controlling the addition of glass to that container in accordance with variations in such pressure.

Other objects and advantages of the invention will be pointed out and become apparent from the following description of a practical embodiment of the invention, such embodiment being shown in the accompanying drawing, in which:

The figure is a view in elevation, partly in vertical section, showing the invention operatively applied to a container for a supply body of molten glass, only a portion of the container being shown and parts of the mechanism being shown diagrammatically.

In the drawing, the numeral 1 designates a portion of a glass-melting tank, furnace or other container in which a body of molten glass 2 is disposed. The container 1 is shown as including a laterally extending portion 3, the top or cover structure of which is located relatively close to the surface of the glass therebeneath but is separated therefrom by a space 4. The top of the container portion 3 has a vertical opening 5 adapted to accommodate the lower end portion of a fluid pressure discharge tube 6.

The tube 6 may be made of a heat resisting non-corrosive metal and constitutes a part of a pressure fluid glass level measuring device or gauge which is generally designated 7. The lower end of the tube 6 is open and the upper end portion thereof is in open communication with oppositely extending tubes 8 and 9. The tube 8 is the pressure fluid supply conduit of the device 7 and may receive fluid under pressure from any convenient source of supply. Flow of pressure fluid through the tube 8 to the discharge tube 6 may be regulated by a valve 10 and by a lateral bleeder opening 11 in a portion of such tube. The pressure in the tube 8 and associate parts of the pressure fluid glass level measuring device at any time may be indicated by a pressure gauge 12 of any suitable known type of construction.

The tube 9 leads to a pressure-responsive control mechanism, generally designated 13 for converting changes in the pressure condition in the device 7 into changes in the operation of mechanism for controlling the addition of glass to the supply body 2. The pressure responsive control mechanism may comprise a pressure operated switch unit 14 which is shown more or less diagrammatically and need not be described in detail since it is well known in the art and may be obtained as a commercial unit and installed without any material change therein. It is believed sufficient for the purpose of this specification, to state that the unit 14 includes a switch 15 for opening and closing an electric circuit, a spring actuated mechanism 16 tending to maintain the switch 15 in a certain condition, and a bellows or like pneumatic device 17 operatively connected with the mechanism 16 and adapted to be actuated in one direction by a spring 18 and in the opposite direction by pressure from the tube 9.

The responsive control mechanism 13 also may include an electrically operated mechanism, shown diagrammatically at 19, which is connected electrically through the wires 20 and 21, the switch 15, and the wire 22 with a suitable source of electric current supply.

The mechanism 19 may be a motor for directly operating suitable mechanism (not shown) for feeding glass-making materials to the melting end of a tank or furnace of which the structure 1 is a part or with which the structure 1 is operatively connected. Instead of directly operating mechanism for feeding glass-making materials, the mechanism 19 may be of such character as to vary the operation of other means for operating the mechanism for feeding glass-making materials to the tank or furnace, an example of which is disclosed in the patent to Amsler No. 1,889,510, granted November 29, 1932.

The mechanism 19 may be of any other known character that would render it useful in the performance of the broad object of the invention. For example, it may actuate an audible or other signal device for giving notice to an operator of an undesirable change of glass level should the glass-making materials be fed by hand or should it be desirable to apprise the operator of the change of level for any other reason.

The operation of the mechanism that has been described may be substantially as follows:

The pressure fluid glass level measuring device 7 may be supported in any suitable known manner so that the spacing of the open lower end of the tube 6 from the surface of the glass in the container 1 will be adequate to permit fluid under pressure to pass from the tube 6 into the space above the glass in the tank at a predetermined rate when the glass is at a predetermined desirable level. A change of level of the glass will change the spacing between the surface of the glass and the lower end of the tube 6 and thus vary the pressure in the tubes 6 and 9. When this change of pressure is adequate, the mechanism 17 of the unit 14 will be operated to effect a change in the condition of the switch 15. Thus, if the switch 15 be closed, as shown, when the level of the glass is as desired, a rise of level will cause pressure to be built up in the tubes 6 and 9, so that the switch 15 will be opened and will break the electrical circuit controlling the mechanism 19. The consequent stoppage of operation of the mechanism 19 may either completely stop feed of glass-making materials to the supply tank or furnace, or a decrease in the rate at which such materials are fed thereto, according to the type of mechanism employed for feeding such materials. This in turn will cause a lowering of the level of glass in the container, assuming, of course, that withdrawal of glass therefrom continues as usual. The pressure condition at the lower end of the tube 6 and in tubes 8 and 9 thus will be restored to the normal and the unit 14 will act automatically to close the switch 15 thereof, thereby closing the circuit controlling the mechanism 19 and effecting resumption of or increase in the rate of the feeding of the glass-making materials to the supply tank or furnace.

Operations substantially as described may be repeated as required to maintain the level of the glass of the supply body substantially constant.

The fluid under pressure supplied to the tube 6 may be air, gas, or other fluid under pressure, and may be combustible so that the combustion thereof may be utilized to heat the glass. If air is used, the same may be preheated if it is desired to avoid any cooling action on the glass.

While the tube 6 is shown as applied to a portion of the container on which the top wall is located relatively close to the surface of the glass, it is obvious that such tube may depend through a suitable opening in any portion of the crown or other wall of a glass container, the pressure condition at the discharge end thereof being controlled by the spacing of such end from the glass surface, the size of the glass discharge orifice of the tube 6, and the pressure tending to force such fluid through the tube 6.

The details of construction and the operation of practical embodiments of the invention and the steps of the method of the invention may be modified, altered or changed to meet various conditions of service without departing from the spirit and scope of the invention, which is not to be limited beyond the terms of the appended claims.

I claim:

1. Glass level control mechanism, comprising means for producing a substantially constant pressure condition at a control point adjacent to the surface of the glass in a container when such glass has a predetermined level and a variation in such pressure condition on a change of level of the glass, and means responsive to such change of pressure condition for initiating action to restore said predetermined level of glass in the container.

2. Glass level control mechanism, comprising a pressure fluid glass level measuring device for effecting pressure changes at a control point adjacent to the glass in a container in accordance with changes in the level of the glass from that desired, and means controlled by said pressure fluid glass level measuring device for operating an electrical mechanism when the glass level changes, said electrical mechanism being of a character suitable to initiate action to effect a correction of the glass level.

3. Glass control mechanism, comprising means for discharging a fluid into the space above the glass in a container at a pressure which will be varied by a change of level of the glass in the container from that desired, and mechanism responsive to a change in the pressure at which said fluid is discharged into the container for initiating action to restore said desired level of glass in a container.

4. Glass level control mechanism, comprising a substantially vertical tube having its lower end adjacent to the surface of a supply body of molten glass in a container and adapted to discharge fluid under pressure from its lower end, the relationship between the lower end of the tube and the glass surface being such that a change of level of the glass from that desired will effect a change of pressure in said tube, and a mechanism operable by a change of pressure in said tube to initiate action for restoring said desired level of glass in the container.

5. Glass level control mechanism, comprising a substantially vertical fluid discharge tube having its lower end adjacent to the surface of a supply body of glass in a container and spaced therefrom to permit substantially free flow of fluid under pressure therefrom when a predetermined level of glass is maintained in the container and to cause a restriction of such flow of fluid when the level of the glass in the container rises, a pressure operated switch mechanism adapted to control an electric circuit and to be operated by the building up of pressure in said pipe on restriction of flow of fluid therefrom, and an electrical mechanism in said circuit, said mechanism being of a character suitable to initiate action for correcting the level of glass in the container.

6. Glass level control mechanism, comprising a substantially vertical open tube having its lower end adjacent to a surface of a supply body of glass in a container but spaced therefrom sufficiently to permit substantially unrestricted discharge of fluid under pressure from the lower end of the tube when the glass level is normal, means for supplying fluid under pressure to said tube, a back pressure tube in open communication with said first named tube, and a pressure operated switch mechanism connected with said back pressure tube, said switch mechanism being maintained in a given condition when discharge of fluid through said first named tube is unrestricted and adapted to be operated on building up of pressure in said back pressure tube when flow of pressure from said first named tube has been restricted.

7. The method of controlling the level of molten glass in a container, which comprises providing a substantially constant pressure condition at a control point adjacent to the surface of the glass in a portion of the container when the glass is at a predetermined desired level and a different pressure condition at the control point when the glass level changes, and controlling the addition of glass to the supply body in accordance with the pressure condition at the control point at a given time.

8. The method of controlling the level of glass of a supply body in a glass container, which comprises discharging a fluid under pressure from a tube onto the surface of the glass in a portion of the container so that the pressure within the tube will be maintained substantially constant when a predetermined desirable level of glass is maintained in that portion of the container and will be altered when the level of such glass changes, and controlling the addition of new glass to the supply body in accordance with the variations of pressure in said tube so as to maintain the level of glass of the supply body substantially constant.

9. The method of controlling the level of a supply body of molten glass in a container from which glass is constantly removed and to which new glass is constantly added, which comprises establishing a pressure condition at a control point above the glass in a portion of the container of such character as to be varied when the level of the glass in that portion of the container rises to a predetermined extent above a predetermined level, causing a decrease in the rate of addition of new glass to said supply body whenever said pressure condition at the control point has been varied by a rise of the glass level above said predetermined level, and restoring the prior rate of addition of new glass to said supply body when the glass level has again fallen to said predetermined level.

HAROLD W. McINTOSH.